Aug. 20, 1957 M. BITZER 2,803,225
WINDSHIELD WIPER MOTOR VALVE
Filed Feb. 16, 1956 2 Sheets-Sheet 2
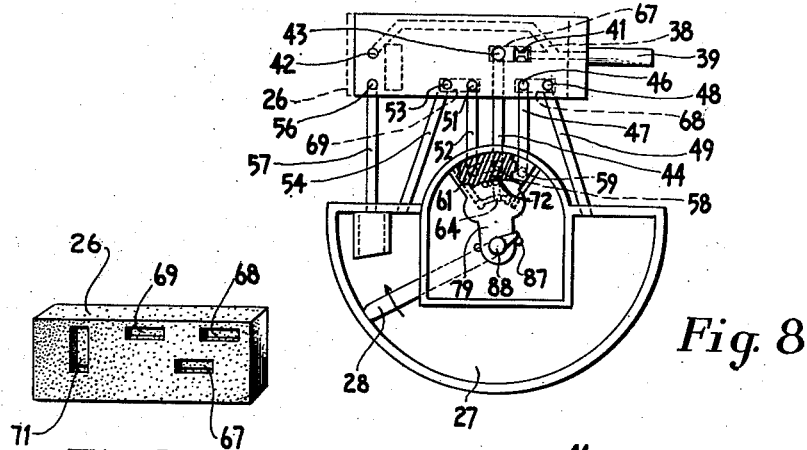
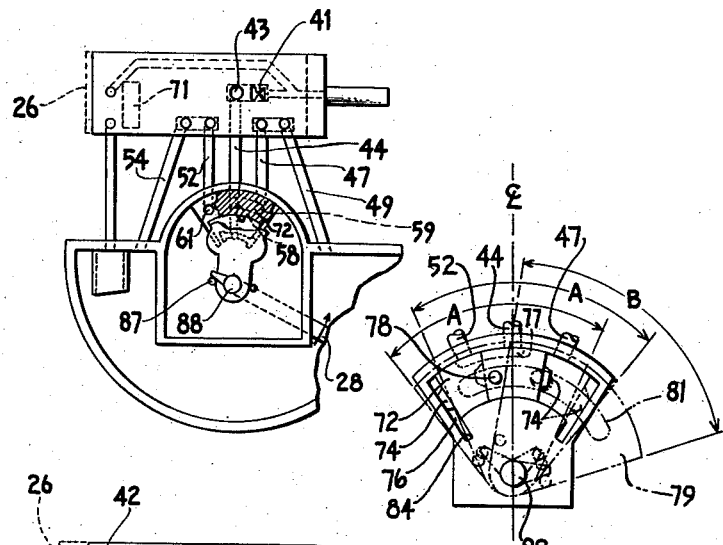
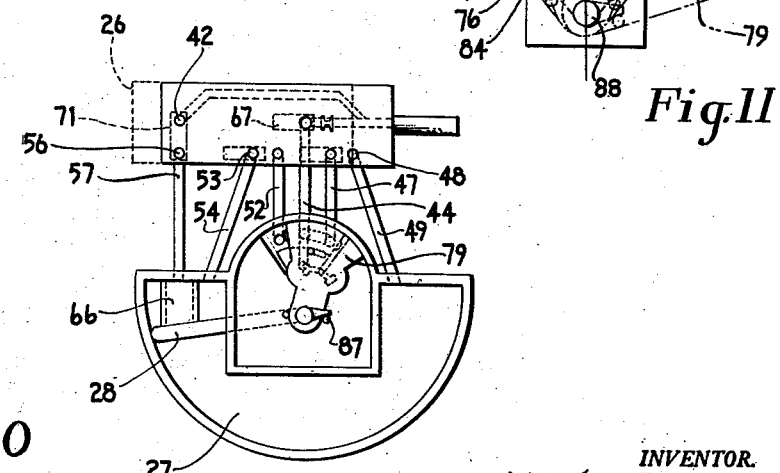
INVENTOR.
Martin Bitzer
BY
Bean Brooks Buckley & Bean
ATTORNEYS

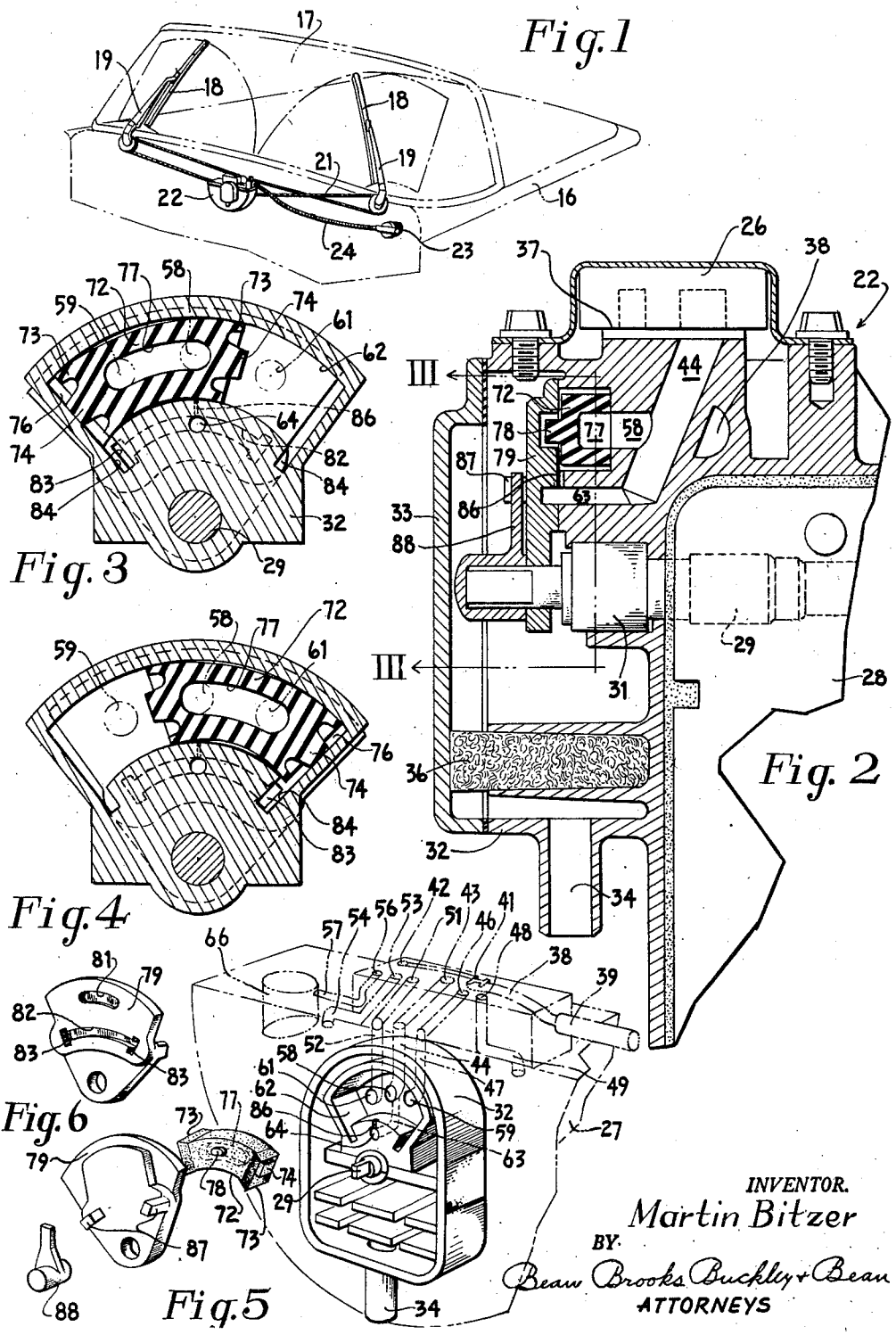

United States Patent Office 2,803,225
Patented Aug. 20, 1957

2,803,225

WINDSHIELD WIPER MOTOR VALVE

Martin Bitzer, Kenmore, N. Y., assignor to Trico Products Corporation, Buffalo, N. Y.

Application February 16, 1956, Serial No. 565,857

13 Claims. (Cl. 121—97)

This invention relates to windshield wiper motors, and more particularly to a pressure fluid operated valve for use on such motors.

Many windshield wiper motors of the prior art rely upon some form of mechanical linkage to effect shifting of the distributing valve for operation of the motor piston. In certain types of vacuum operated wiper motors the mechanism for shifting the valve, which connects the vacuum source alternately to opposite sides of the motor piston, incorporates a spring which must be strong enough for conditions of maximum vacuum realized during motor operation. Obviously, the spring will be overpowered for valve operation when the motor is operating at less than maximum vacuum, causing greater wear on certain parts and resulting in noises. While some of the wiper motors of the prior art have been known to utilize a pressure fluid operated distributing valve, such motors usually required a complicated type of mechanism to produce the desired results. In general, it may be said that the pressure fluid windshield wiper motors of the prior art incorporate a more or less complicated distributing valve shifting mechanism for motor operation. The use of complicated valve shifting mechanisms in wiper motors is undesirable for many reasons, such as, the parts are more subject to wear and breakage, the mechanism may be noisy and slow in response, or may be more difficult to accurately control, and the operating characteristics may vary appreciably over the full range of motor operation.

The main object of this invention is to provide a windshield wiper motor, with a pressure fluid operated distributing valve, that is simple in structure and which will provide reliable and long life operation.

A further object is to provide a windshield wiper motor, with a pressure fluid operated distributing valve, that is practically noiseless in operation and which has a rapid response characteristic.

Another object of the invention is to provide a windshield wiper motor, with a pressure fluid operated distributing valve, that may be accurately controlled and which has operating characteristics that are constant over the full range of motor operation.

These and further objects and features of the invention will become more apparent from the following description and the accompanying drawings wherein:

Fig. 1 is a fragmentary perspective view of a motor vehicle having a windshield wiper motor with a pressure fluid operated distributing valve of the invention;

Fig. 2 is a partial section view of the windshield wiper motor of Fig. 1;

Fig. 3 is a section view as seen from line III—III in Fig. 2 and showing the pressure fluid operated valve of the invention in one position;

Fig. 4 is a section view like Fig. 3, showing the valve in another position;

Fig. 5 is a fragmentary perspective view of the windshield motor of Fig. 1 showing in exploded position certain elements included in the assembly of the pressure fluid operated valve;

Fig. 6 is a perspective view of a reverse side of one of the elements shown in Fig. 5;

Fig. 7 is a perspective view of a slide valve used in the wiper motor of Fig. 1;

Fig. 8 is a schematic illustration showing certain parts of the wiper motor of Fig. 1 in one position during motor operation;

Fig. 9 is a schematic illustration as in Fig. 8, but showing said parts in another position during motor operation;

Fig. 10 is a schematic illustration as in Fig. 8, but showing said parts in the position assumed when the motor is parked; and Fig. 11 is a schematic illustration showing superimposed positions of the pressure fluid operated valve as assumed in the Figs. 8–10 phases of motor operation.

Referring now to Fig. 1, numeral 16 identifies a motor vehicle having a windshield 17 and a pair of wipers 18 mounted upon wiper arms 19 which are affixed to shafts reciprocally rotated by a transmission mechanism, such as cables 21 connected to a wiper motor 22 positioned under the hood of the vehicle in the usual manner. A control knob 23, located for convenient manipulation by the vehicle operator, has a Bowden wire 24 connected to the wiper motor in a manner to regulate the setting of a slide valve 26 (Fig. 2) as is well known to those skilled in the art.

The wiper motor 22 has a semi-circular motor chamber 27 in which is positioned a vane-like motor piston 28 affixed at the upper end to a motor shaft 29, whereby the piston can reciprocate in pendulous manner within the motor chamber. Motor shaft 29 has a bearing 31 near one end for the support of the shaft in the wall of the motor chamber, while the opposite end of the shaft projects from the motor chamber and drivingly supports a cable pulley (not shown) to which the cables 21 are attached.

On the side of the motor chamber is formed a valve housing 32 to which is removably affixed a cover plate 33. The valve chamber formed in the valve housing 32 under cover plate 33, is open to atmosphere at all times by passageway 34, the air flowing therein passing through a filter means 36. At the upper surface of the motor chamber is arranged a valve head 37 on which the slide valve 26 is seated. The arrangement and function of the slide valve is somewhat similar to that disclosed in Patent 2,617,136.

A vacuum supply passageway 38 is formed in the valve head 37, which passageway is arranged to receive at one end a nipple 39 that connects with a hose, or conduit (not shown) attached at the other end to a source of vacuum supply, such as the motor vehicle intake manifold. Connecting with passageway 38 and extending to the surface of the valve head 37, are ports 41 and 42, the former port being I-shaped and of increasing cross section area toward one end to provide for increased air flow as the slide valve is moved toward full on position, as will be more apparent later. Further ports are provided on the surface of the valve head as follows: port 43 which forms one end of passageway 44; port 46 which forms one end of passageway 47; port 48 which forms one end of passageway 49; port 51 which forms one end of passageway 52; port 53 which forms one end of passageway 54; and port 56 which forms one end of passageway 57.

Passageways 44, 47 and 52 extend downwardly to ports 58, 59 and 61 respectively, which open onto a rear wall of a distributing valve chamber 62, having the form of a sector of an annulus; a further passageway 63 connects passageway 44 to a port 64 which opens onto a wall of the valve housing, as best seen in Fig. 5. Passageway 49 extends downwardly and opens into the motor chamber on one side of the motor piston 28, while passageway 54 extends downwardly and opens into the motor chamber on the other side of the motor piston. Passageway 57 extends downwardly and opens through a parking chamber, or seat, 66 into the motor chamber 27 to park the motor piston as will be described in greater detail.

The slide valve 26 is preferably made from a rubber-like material and has a plurality of slots in its lower surface, slot 67 being arranged for bridging ports 41 and 43 during motor operation, slot 68 being arranged for bridging ports 46 and 48 during motor operation, slot 69 being arranged for bridging ports 51 and 53 during motor operation, and slot 71 being arranged for bridging ports 42 and 56 to effect motor parking.

Arranged in the chamber 62 is a rubber-like distributing valve 72, which has the form of said chamber, i. e., a sector of an annulus, but slightly smaller in cross section and is flared at each end to provide oppositely facing heads with sealing lips 73 which snugly engage the walls of the chamber 62 in an air-tight manner to constitute a piston that is responsive to fluid pressure. Piston-forming valve 72 has a spacer, or stop, 74 projecting from each end beyond the sealing lips, to provide a clearance space 76 between the side of the chamber 62 and the sealing lips at the end of the valve, when the stop 74 contacts the side of the chamber, as seen in Figs. 3 and 4. On the inner side of the distributing valve is a curved groove, or slot 77 that is arranged to bridge port 58 and either port 59 or 61, depending upon the position of the valve in chamber 62. On the opposite side of the valve is a lug 78, which functions to assure proper position of the valve when the motor piston is parked, as will be more apparent hereinafter.

A valve actuating member, or shuttle 79, is pivotally supported on the end of motor shaft 29, the inner surface of the shuttle being in engagement with the end surfaces of the distributing valve chamber 62. Arcuate grooves, or slots 81 and 82 are formed on the inner surface of the shuttle 79, slot 81 being arranged for reception of valve lug 78, while slot 82 is arranged for alignment with port 64, as the shuttle oscillates upon the motor shaft. At each end of slot 82 is a short slot 83 perpendicular to slot 82, which is arranged for alignment with slot means 84 formed at each end of the chamber 62, and adapted for communication with a respective clearance space 76. A passageway 86 extends upwardly from the passageway 63 and opens into the valve chamber 62. On the outer surface of the shuttle 79 are two symmetrically disposed projections, or pins 87, adapted to be alternately contacted by an arm 88 which is affixed to the end of the motor shaft 29. It will be seen that as the shaft oscillates, the arm 88 provides oscillatory movement to the shuttle 79 by virtue of the arm 88 being brought in alternate engagement with each of the pins 87. The arcuate length of the shuttle 79, in the region wherein the shuttle covers the valve chamber 62, is slightly less than the arcuate length of said chamber, so that atmospheric pressure may be admitted alternately to each end of the valve chamber 62, to assist in providing movement of the distributing valve 72, which movement will now be described in greater detail.

Referring now more particularly to Figs. 8 and 9, the illustrations show the position of certain movable parts of the motor during operation. Slide valve 26 has been moved by the Bowden wire 24, as adjusted by the vehicle operator, so that groove 67 is bridging ports 41 and 43, groove 68 is bridging ports 46 and 48, and groove 69 is bridging ports 51 and 53. The valve 72, as a result of pressure differential at opposite ends, will be maintained in the left of center position, as shown in Fig. 8. It is to be noted that the pressure on the sides of the valve 72 is balanced during valve operation, because vacuum condition existing in groove 77, also exists on the other surfaces of the valve by virtue of passageway 86 opening into chamber 62. Vacuum, or sub-atmospheric pressure, existing in vacuum supply passageway 38, is transmitted to the motor chamber on one side of the motor piston 28 via passageway 44, port 58, valve groove 77, port 61 and passageways 52 and 54. Simultaneously, the opposite side of the motor piston 28 is exposed to atmospheric pressure by virtue of shuttle 79 uncovering the edge of valve chamber 62 so that atmosphere from under the cover 33 will flow into port 59, passageway 47, and passageway 49 into the motor chamber, resulting in a pressure differential acting upon the motor piston to cause movement thereof.

As the motor piston 28 approaches the end of its movement, the arm 88 will engage one of the pins 87, i. e., the one right of center, and shift the shuttle 79 so that the opposite end of the valve chamber 62 is exposed to atmospheric pressure, while the other end of the chamber, formerly under atmospheric pressure, will be exposed to vacuum transmitted to the end of the valve chamber by way of slots 82 and 83. As soon as the shuttle moves to effect said change of pressure in the valve chamber 62, the valve 72 will quickly move to the right of center position, as shown in Fig. 9, so that vacuum in the supply passageway 38, is transmitted to the motor chamber, on the other side of the motor piston via passageway 44, port 58, valve groove 77, port 59, and passageways 47 and 49. Simultaneously, the opposite side of the motor piston 28 is exposed to atmospheric pressure by virtue of shuttle 79 uncovering the edge of valve chamber 62 so that atmosphere from under the cover 33 will flow into port 61, passageway 52, and passageway 54 into the motor chamber, resulting in a pressure differential acting upon the motor piston, to cause movement thereof.

As the motor piston 28 approaches the end of its movement, the lever 88 will engage the pin 87 left of center, and shift the shuttle 79 toward the end of the chamber 62 and expose the other end of the chamber to atmospheric pressure, while the opposite end of the chamber, formerly under atmospheric pressure, will be exposed to vacuum transmitted to the end of the valve chamber by way of slots 82 and 83. In this respect, it is to be noted that the length of slot 82 is such as to transmit vacuum to only one end of the valve chamber at any one time. As soon as the shuttle moves to effect said change of pressure conditions in the valve chamber 62, the valve 72 will quickly move to the left of center position, as shown in Fig. 8, to begin another operative cycle, as described heretofore. The detail structure and specific relationship of the operative parts is such as to cause a reversal of the valve 72 prior to the time the motor piston has completed its movement in a given direction, thus providing a cushioning, or braking effect, so that the motor piston completes its movement under conditions of pressure differential deceleration. In such manner there is less danger for impacting or pounding at piston end stroke, resulting in reduced wear and tear on parts, and providing for more quiet motor operation, and less inertia effect throughout transmission of motion all the way to the wiper blade itself.

It will further be seen that the valve 72 will be exposed on both sides to approximately the same pressure condition, resulting in a balanced valve which provides for constant operational characteristics over the full range of vacuum conditions occurring during motor operation.

To set the motor for parking, the slide valve 26 is moved by Bowden wire 24, to the Fig. 10 position, whereby the vacuum connection to passageway 44 is discontinued, and a vacuum connection is established in passageway 57 leading to the parking chamber 66. In such position, the valve simultaneously uncovers port 48 so that the motor chamber, on the side of the motor piston opposite to the parking chamber 66, is exposed to atmosphere thereby resulting in pressure differential on the motor piston to move the latter into engagement with the end of the parking chamber. In so doing, the arm 88, engages the pin 87, right of center, to move the shuttle 79 to its extreme right angular position. During such shuttle movement, the slot 81 engages the valve lug 78, and moves the valve 72 to the position shown in Fig. 9, thus assuring starting of the motor when the slide valve is moved to motor operating position, viz., Fig. 8 or 9. It is to be noted that the slot 81 is of such length so as not to engage the valve lug 78 during motor operation, as the shuttle oscillates for valve motion control, but engages the valve lug only during motor parking operation.

In Fig. 11, the various positions of the shuttle and the valve, have been superimposed to illustrate the range of movement thereof relative to the valve chamber. It will be seen that the range of movement during motor operation, as indicated by arcs "A," are more nearly symmetrical about the vertical centerline, whereas the range of movement during parking, as indicated by arc "B," is angularly displaced a goodly distance from the vertical centerline.

From the foregoing it will be seen that the wiper motor valve arrangement of the invention, is of simple structure, will operate in rapid and noiseless manner, and will meet all the objectives set forth in the early part of the disclosure.

The foregoing description has been made in detail without thought of limitation since the inventive principles involved are capable of assuming other physical embodiments without departing from the spirit of the invention and scope of the appended claims.

What is claimed is:

1. In a windshield wiper motor having a motor chamber, a piston mounted upon a shaft for oscillatory movement in the motor chamber, and a slide valve for connecting a motor operating fluid source to passageways formed in the motor for the operation thereof, the combination including a distributing valve movable by a pressure differential, said distributing valve effective to direct motor operating fluid to opposite sides of said piston to cause movement thereof, a shuttle element pivotally mounted upon the motor shaft and forming part of a valve chamber containing said distributing valve, said shuttle element movable to cause said pressure fluid differential on the distributing valve, and an arm mounted upon the shaft and operable thereby to provide movement to said shuttle element.

2. In a windshield wiper motor having a motor chamber, a piston mounted upon a shaft for movement in the motor chamber, and a valve for connecting a motor operating fluid source to passageways formed in the motor for motor operation, the combination including a distributing valve arranged in an open-sided valve chamber and movable by means of a pressure differential whereby the source of motor operating fluid is alternately connected to the motor chamber on each side of the motor piston, a shuttle member pivotally mounted upon the shaft and adapted in one position to cover the open side of the valve chamber and having other positions in which ends of the valve chamber are alternately uncovered, said shuttle member having a passageway arranged to alternately connect each covered end of the valve chamber with the source of motor operating fluid, and an arm affixed to the end of the shaft and arranged to engage the shuttle member as the piston approaches each end of stroke while moving in the motor chamber.

3. In a windshield wiper motor having a piston chamber, a piston operatively connected to a shaft for movement in the motor chamber, and a control valve for connecting a passageway to a source of operating pressure for motor operation, a distributing valve arranged for reciprocal movement in a valve chamber, said distributing valve having oppositely facing heads which are exposed to pressure differential to move the distributing valve whereby said passageway is alternately connected to the motor chamber on each side of the motor piston, a shuttle member pivotally mounted upon the shaft for oscillatory movement having slot means arranged to connect one head of the distributing valve with said passageway, and being further arranged to simultaneously connect the other head of the distributing valve to atmospheric pressure, and an arm driven by the shaft which is arranged to move the shuttle member as the piston approaches each end of stroke in the motor chamber.

4. A windshield wiper motor having a motor chamber, a piston mounted upon a shaft for oscillatory movement in the motor chamber, a slide valve for connecting a vacuum source to a vacuum passageway formed in the motor, a valve chamber having an open side, a distributing valve arranged in the valve chamber and movable for connecting the vacuum passageway alternately to opposite ends of the motor chamber, a shuttle pivotally supported upon the shaft and adapted for covering the open side of the valve chamber, said shuttle having a passageway for directing vacuum alternately to opposite ends of the valve chamber, and an arm responsive to shaft oscillation to move said shuttle to uncover to atmosphere one end of the valve chamber at the same time that the other end of the valve chamber is being exposed to vacuum to thereby cause a pressure differential between opposite ends of the distributing valve to cause it to be moved in the valve chamber.

5. A windshield wiper motor having a motor chamber, a vane-like piston attached at one end to a shaft for oscillating movement in the motor chamber, a slide valve for connecting a source of vacuum to a vacuum passageway formed in the motor, a valve chamber having one side which may be opened to atmosphere, a distributing valve slidably arranged in the valve chamber and having a passageway for connecting the vacuum passageway alternately to passageways leading to the motor chamber on opposite sides of the piston, a shuttle pivotally mounted upon the shaft and arranged to cover the side of the valve chamber, said shuttle having a slot arranged for alternately connecting the ends of the valve chamber to the vacuum passageway, and an arm affixed to the shaft and engageable with the shuttle to move the latter to uncover one end of the valve chamber at the same time the opposite end of the valve chamber is exposed to vacuum to establish a pressure differential between opposite ends of the distributing valve to slide the latter toward the end of the valve chamber having vacuum condition.

6. A windshield wiper motor having a motor chamber including a parking chamber, a piston operatively connected to a shaft for movement in the motor chamber, a valve for connecting a source of vacuum to a vacuum passageway formed in the motor, a valve chamber having one side which may be exposed to atmospheric pressure, a distributing valve slidably arranged in the valve chamber and having a face slot for connecting the vacuum passageway alternately to other passageways leading to the motor chamber on opposite sides of the piston, said distributing valve also having a nipple for valve positioning during motor piston parking, a shuttle pivotally mounted upon the shaft and arranged to cover the side of the valve chamber, said shuttle having a slot arranged for alternately connecting the ends of the valve chamber to the vacuum passageway and also having a slot one end which is arranged for engaging said nipple during motor piston parking to position said distributing valve in preparation for motor starting, and an arm affixed to the end of the shaft and engageable with the shuttle during each end of piston movement, to move the shuttle whereby one end of the valve chamber is opened to atmospheric pressure at the same time the shuttle slot connects the opposite end of the valve chamber to the vacuum passageway.

7. A windshield wiper motor according to claim 6, wherein the distributing valve has flexible sealing lips at each end to provide air tight engagement of the ends of the valve with the valve chamber.

8. A windshield wiper motor according to claim 7, wherein the sealing lips surround a projecting portion extending from each end of the valve to provide a clearance space between the ends of the sealing lips and the respective end of the valve chamber, when the valve is at one extreme end of movement within the valve chamber.

9. A windshield wiper motor according to claim 8, wherein a passageway is arranged to connect the valve chamber with the vacuum passageway so that vacuum condition exists about the exterior surfaces of the distributing valve during motor operation to balance the vacuum condition existing in the face slot.

10. A windshield wiper motor having a motor chamber including a parking chamber, a vane-like piston attached to a shaft for oscillatory movement in the motor chamber, a slide valve for connecting a source of vacuum to a vacuum passageway formed in the motor, a valve chamber arranged adjacent the motor chamber and having the form of a sector of an annulus with an open side exposable to atmospheric pressure, a distributing valve slidably arranged in the valve chamber and having the form of a sector of an annulus, said distributing valve having a slot which connects the vacuum passageway with either of two passageways each leading to the motor chamber one on each side of the piston, a shuttle pivotally mounted upon the shaft and arranged to cover the open side of the valve chamber, said shuttle having a slot arranged for alternately connecting the ends of the valve chamber to the vacuum passageway, and an arm affixed to the end of the shaft and engageable with the shuttle as the piston approaches each end of its movement, whereby the shuttle is moved to uncover one end of the valve chamber so that it is exposed to atmospheric pressure while the slot in the shuttle connects the opposite end of the valve chamber to the vacuum passageway.

11. A windshield wiper motor according to claim 10, wherein a parking chamber is arranged in the motor chamber for seating the piston during parking, said slide valve being further arranged to connect the parking chamber to the source of vacuum while atmospheric pressure is maintained on the side of the piston opposite the seating side.

12. A windshield wiper motor according to claim 11, wherein the distributing valve has a nipple for engagement with the end of a slot formed in the shuttle during piston parking, so that the distributing valve will be assured of proper positioning to facilitate motor starting when the slide valve is moved to motor operating position.

13. In a windshield wiper motor having a motor chamber, a piston mounted upon a shaft for oscillatory movement in the motor chamber, and a slide valve for connecting a motor operating fluid source to passageways formed in the motor for the operation thereof, the combination including a distributing valve movable by a pressure differential, said distributing valve effective to direct motor operating fluid to opposite sides of said piston to cause movement thereof, a movable shuttle element forming part of a valve chamber containing said distributing valve, said shuttle element movable to cause said pressure fluid differential on the distributing valve, and an arm driven by the shaft to provide movement to said shuttle element.

References Cited in the file of this patent

UNITED STATES PATENTS

| | | |
|---|---|---|
| 1,200,681 | Woodward | Oct. 10, 1916 |
| 2,254,641 | Bannister | Sept. 2, 1941 |